United States Patent
Estes et al.

(10) Patent No.: US 10,819,122 B2
(45) Date of Patent: Oct. 27, 2020

(54) SYSTEMS AND METHODS TO USE CELL BALANCING RESISTOR(S) OF BATTERY PACK TO REDUCE CHARGE LEVEL OF BATTERY CELLS

(71) Applicant: Lenovo (Singapore) Pte. Ltd., Singapore (SG)

(72) Inventors: Larry Glenn Estes, Durham, NC (US); Jeremy Robert Carlson, Cary, NC (US); Bouziane Yebka, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 406 days.

(21) Appl. No.: 15/946,518

(22) Filed: Apr. 5, 2018

(65) Prior Publication Data
US 2019/0312443 A1  Oct. 10, 2019

(51) Int. Cl.
*H02J 7/00* (2006.01)
*H01M 10/48* (2006.01)
*H01M 10/42* (2006.01)

(52) U.S. Cl.
CPC ......... *H02J 7/0014* (2013.01); *H01M 10/425* (2013.01); *H01M 10/482* (2013.01); *H01M 10/486* (2013.01); *H01M 2010/4271* (2013.01)

(58) Field of Classification Search
CPC ... H02J 7/0014; H01M 10/486; H01M 10/482
USPC .... 320/132–136; 361/79, 83, 87, 93.1, 93.2, 361/93.9, 101
See application file for complete search history.

(56) References Cited

U.S. PATENT DOCUMENTS

| | | | |
|---|---|---|---|
| 5,479,084 A | 12/1995 | Satsuma et al. | |
| 5,751,217 A | 5/1998 | Kchao et al. | |
| 5,920,180 A | 7/1999 | Kim | |
| 6,288,521 B1 | 9/2001 | Meador | |
| 6,545,447 B1 * | 4/2003 | Smith | H01M 10/44 320/132 |
| 7,786,696 B2 * | 8/2010 | Kim | H01M 16/006 320/112 |
| 8,264,206 B2 * | 9/2012 | Sim | H02J 7/0047 320/136 |
| 8,659,267 B2 | 2/2014 | Yun | |
| 2001/0035740 A1 | 11/2001 | Palanisamy | |
| 2004/0128089 A1 | 7/2004 | Barsoukov et al. | |
| 2005/0170256 A1 | 8/2005 | Cummings | |
| 2008/0116851 A1 | 5/2008 | Mori | |
| 2010/0085015 A1 | 4/2010 | Hamaguchi et al. | |
| 2011/0019326 A1 | 1/2011 | Odaohhara | |
| 2012/0139494 A1 | 6/2012 | Kim | |

(Continued)

*Primary Examiner* — Richard V Muralidar
(74) *Attorney, Agent, or Firm* — John M. Rogitz; John L. Rogitz (57) ABSTRACT

In one aspect, a device includes system components and a battery pack. The battery pack includes one or more cell balancing resistors, plural battery cells in a circuit with the one or more cell balancing resistors, at least one processor, and storage accessible to the processor. The storage includes instructions executable by the processor to determine whether a threshold amount of time has accrued during which the device has not been operated on battery power and, responsive to a determination that the threshold amount of time has accrued, employ the one or more cell balancing resistors of the battery pack to reduce the charge level of the plural battery cells.

20 Claims, 6 Drawing Sheets

(56) References Cited

U.S. PATENT DOCUMENTS

| | | |
|---|---|---|
| 2013/0181681 A1 | 7/2013 | Mukai et al. |
| 2013/0249494 A1 | 9/2013 | Ju et al. |
| 2013/0307476 A1 | 11/2013 | Darragh et al. |
| 2014/0342193 A1 | 11/2014 | Mull et al. |
| 2015/0061572 A1* | 3/2015 | Ju .................. B60L 58/13 320/107 |
| 2015/0357845 A1 | 12/2015 | Railey |
| 2016/0064968 A1 | 3/2016 | Lee et al. |
| 2016/0097820 A1* | 4/2016 | Thompson .......... G01R 31/374 320/134 |
| 2016/0149275 A1 | 5/2016 | Minamiura |
| 2016/0149423 A1 | 5/2016 | Liu et al. |
| 2016/0201634 A1 | 7/2016 | Kim et al. |
| 2017/0077717 A1 | 3/2017 | Lundgren et al. |

* cited by examiner

SYSTEMS AND METHODS TO USE CELL BALANCING RESISTOR(S) OF BATTERY PACK TO REDUCE CHARGE LEVEL OF BATTERY CELLS

BACKGROUND

As recognized herein, many consumer electronics devices such as personal computers (PCs) are left connected, for an extended period of time, to a wall outlet providing alternating current (AC) power. As a result, many batteries such as lithium-ion batteries can degrade more quickly and undergo undesirable swelling when kept at a relatively high state of charge without being used during such an extended period of time. There are currently no adequate solutions to the foregoing computer-related, technological problem.

SUMMARY

Accordingly, in one aspect a device includes system components, at least one processor, and and a battery pack. The battery pack includes one or more cell balancing resistors, plural battery cells in a circuit with the one or more cell balancing resistors, and storage accessible to the processor. The storage includes instructions executable by the processor to determine whether a threshold amount of time has accrued during which the device has not been operated on battery power and, responsive to a determination that the threshold amount of time has accrued, employ the one or more cell balancing resistors of the battery pack to reduce the charge level of the plural battery cells.

In another aspect, a method includes using a processor to determine whether a threshold amount of time has accrued during which a device coupled to a battery pack has not been operated on battery power. The method also includes using, responsive to determining that the threshold amount of time has accrued, the processor to control one or more cell balancing resistors of the battery pack to reduce the charge level of battery cells within the battery pack.

In still another aspect, a computer readable storage medium that includes instructions executable by a processor. The instructions are executable to determine whether a threshold amount of time has accrued during which a device coupled to a battery pack has not been operated on battery power but has been operated using an AC/DC power supply. The instructions are also executable to, responsive to a determination that the threshold amount of time has accrued, control one or more resistors inside the battery pack to reduce the charge level of battery cells within the battery pack.

The details of present principles, both as to their structure and operation, can best be understood in reference to the accompanying drawings, in which like reference numerals refer to like parts, and in which:

DETAILED DESCRIPTION

The present application discloses systems and methods for a battery pack to automatically lower the charge level of its cells when the pack detects that a device to which it is coupled has been operating for an extended time period using an AC power source. This may extend the battery's useful life and reduce the rate of cell swelling without a user having to provide input, without hardware items external to the battery pack having to be used to help lower the charge level of the battery cells, and without software executing externally to the battery pack having to be used to help lower the charge level of the battery cells.

This may be accomplished using cell-balancing resistors within the battery pack to reduce the charge level of the battery cells while connected to the AC power source for at least a threshold amount of time. It may also be accomplished using other cell-balancing circuits, including passive circuits (that may or may not include a resistor) and including active circuits like a switching circuit that might transfer charge from one battery cell to another. Additionally, for one-cell batteries, another resistor, field-effect transistor (FET), or current path in the battery pack or host device may be used to actively lower charge level instead of using a cell balancing resistor.

With respect to any computer systems discussed herein, a system may include server and client components, connected over a network such that data may be exchanged between the client and server components. The client components may include one or more computing devices including televisions smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field. programmable gate array (FPGA) modules, or any other convenient manner as could be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
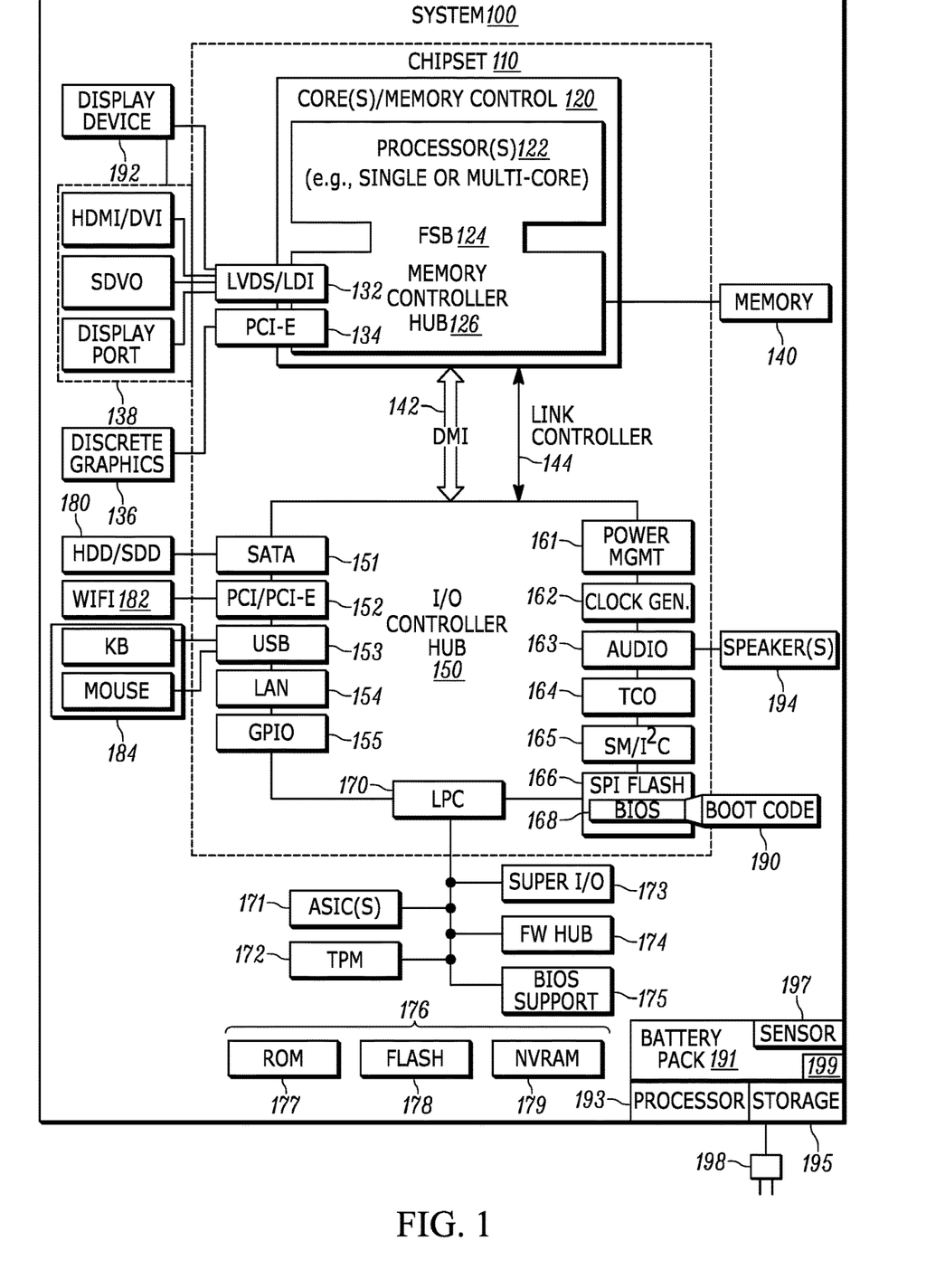
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMID®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCLE port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system may also include a battery pack 191. The battery pack 191 itself may include its own one or more processors 193, such as a microprocessor or any other type of processor that might be provided as part of a gas gauge or battery management unit (BMU) for the battery pack. Non-transitory storage 195 may also be included in the battery pack 191 itself, with the storage 195 storing firmware in accordance with present principles and/or being updateable to store firmware in accordance with present principles if, for example, the firmware is transferred to the storage 195 at some point after manufacturing and/or vending of the system 100. Regardless, in some embodiments both the processor(s) 193 and storage 195 may form part of a BMU that may also include random access memory (RAM) and other items.

The battery pack 191 may further include one or more sensors 197 for sensing and measuring things related to the battery pack 191 and/or battery cells within, such as temperature, voltage, electric potential, age, impedance, state of charge, etc. The sensors 197 may provide input/measurements to the processor(s) 193 and/or the processor(s) 122.

The pack 191 may also include a button 199 that may be a touch-sensitive button flush with the housing of the system 100/pack 191. Alternatively, the button 199 may be a depressable button physically protruding from the housing. In any case, the button 199 may be selectable to command the battery pack 191 to enter a mode in which cell balancing resistors are employed in accordance with present principles and/or a mode in which the logic of FIG. 4 and/or FIG. 5 may be executed. Additionally or alternatively, the button 199 may be selectable to command the battery pack 191 to lock in the mode until the button 199 is again selected to unlock the mode.

Additionally, note that one or more battery cells within the pack 191 may be configured in jellyroll format. The cells may also be configured in pouch cell format in which the strip(s) of active material are folded, or in a stacked format. In either case, the battery cells may be a Lithium ion battery cells or another type of battery cell.

It is to be further understood in accordance with present principles that the battery pack 191 may be electrically coupled to and power the system 100, and/or individual components thereof, using battery power. The system 100 and/or battery back 191 in particular may also be electrically coupled to at least one receiver on the system 100 for receiving a charge via an AC/DC power supply 198 connected to an AC power source (e.g., a wall outlet providing AC power) to charge the one or more battery cells in the pack 191. Thus, the receiver on the system 100 can include at least one circuit configured for receiving power from a wall outlet (or other AC power source) via the power supply 198 and then providing power to the system 100 to power it and also providing power to the battery pack 191 to charge the cells within the pack 191.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
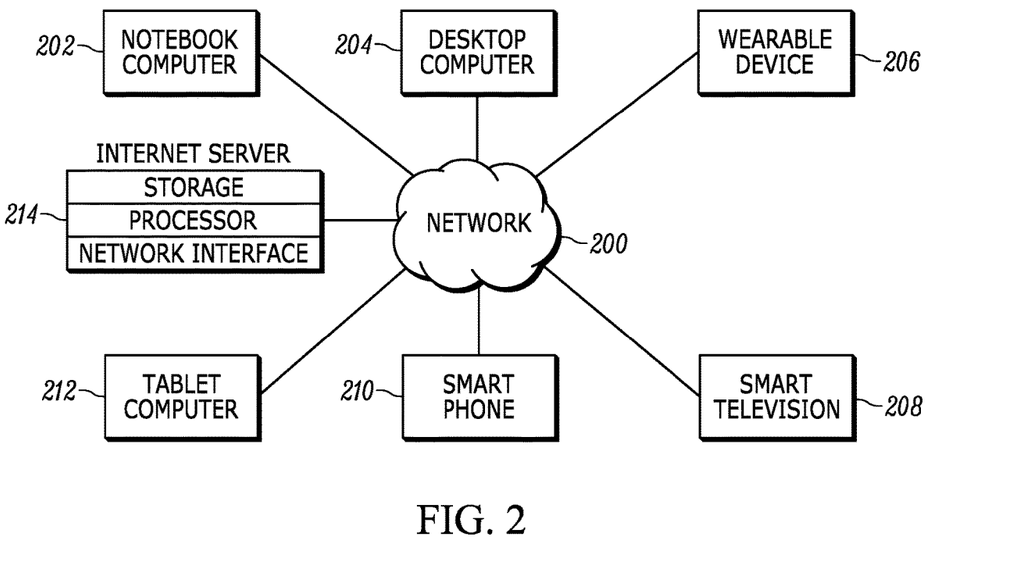
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above, including a battery pack and associated firmware stored in read-only memory internal to the battery pack in accordance with present principles. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
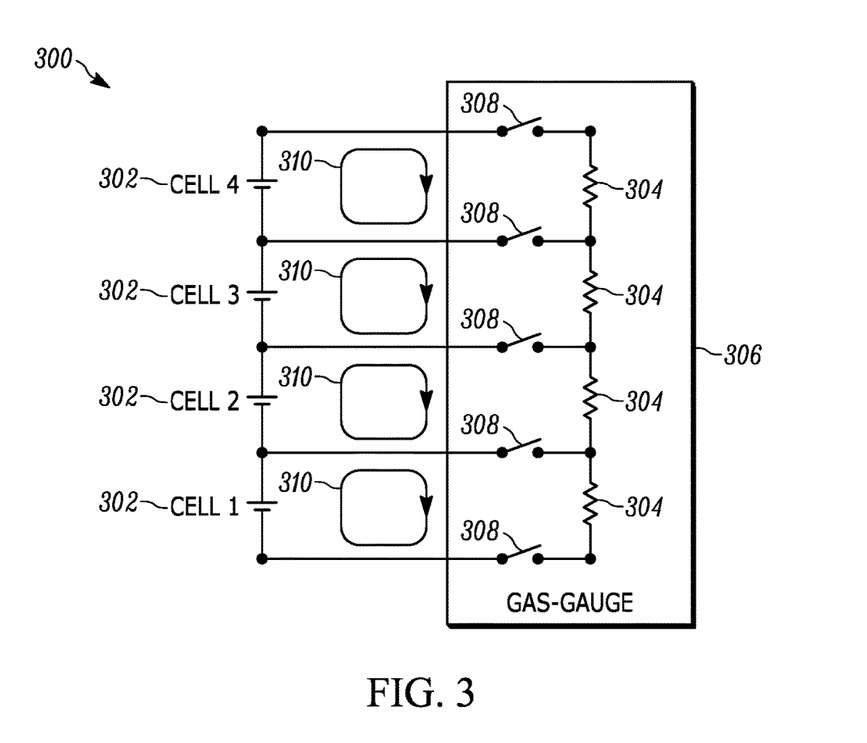
FIG. 3 is a block diagram of elements that may be included in a battery pack in accordance with present principles.

Now referring to FIG. 3, it shows an example block diagram of a portion of a battery pack 300 that includes plural battery cells 302 connected in series as well as cell balancing resistors 304 that may couple/connect the plural battery cells 302 to each other as shown. The resistors 304 may be in a gas gauge integrated circuit (IC) 306 of the pack 300 in accordance with present principles, or may be external to the gas gauge IC 306 but still within the battery pack 300 to at least in part establish a circuit in accordance with present principles. In addition to the foregoing, also note that the cells 302 may be electrically coupled to each through direct tab connections (e.g., as the main connection/current path).

FIG. 3 also shows that electrical switches and/or field-effect transistors (e.g., metal-oxide-semiconductor field-effect transistors (MOSFETs)) 308 may be disposed in the pack 300, and even in the gas gauge IC 306 specifically, with the switches 308 being in series with the resistors 304 as shown. However, note that in other embodiments the switches 308 may be external to the gas gauge IC 306 but still within the battery pack 300 to at least in part establish a circuit in accordance with present principles. Regardless, it is to be understood that the switches 308 may be actuated (e.g., turned on and off) by a processor within the battery pack 300 and/or by the gas gauge IC 306 itself for current to pass to/through a respective resistor 304.

During "normal" cell balancing in accordance with present principles, one of the resistors 304 may be used to bleed charge off of a single, proximate cell 302 that currently has the highest voltage of amongst all the cells 302 to thus bring its voltage down to the level of the other cells 302 so that the cells 302 are equalized and/or balanced. For this, only one switch 308 may be turned on at a given time for voltage from the highest-voltage cell 302 to bleed to a given (e.g., most-proximate) resistor 304 even though in such an instance that particular resistor 304 would not transfer charge from the highest-voltage cell 302 to another cell 302. Instead, the resistor that is bleeding voltage from the highest-voltage cell 302 may convert to heat any excess energy from the highest-voltage cell 302.

However, also in accordance with the principles set forth herein, all cells 302 may be discharged simultaneously/ concurrently using plural resistors 304 that may convert energy to heat which in turn may reduce the overall voltage/ charge level of the cells 302 while current may pass from one of the cells 302 to another one of the cells 302 through a respective resistor 304 as represented by arrows 310. Hence, in such examples all applicable switches 308 within the pack 300 may be turned on so that all the resistors 304 may be used at the same time for reducing the charge level/voltage of the cells 302. This may occur, e.g., at block 410 of FIG. 4 or block 506 of FIG. 5, as set forth further below.

Figure 4:
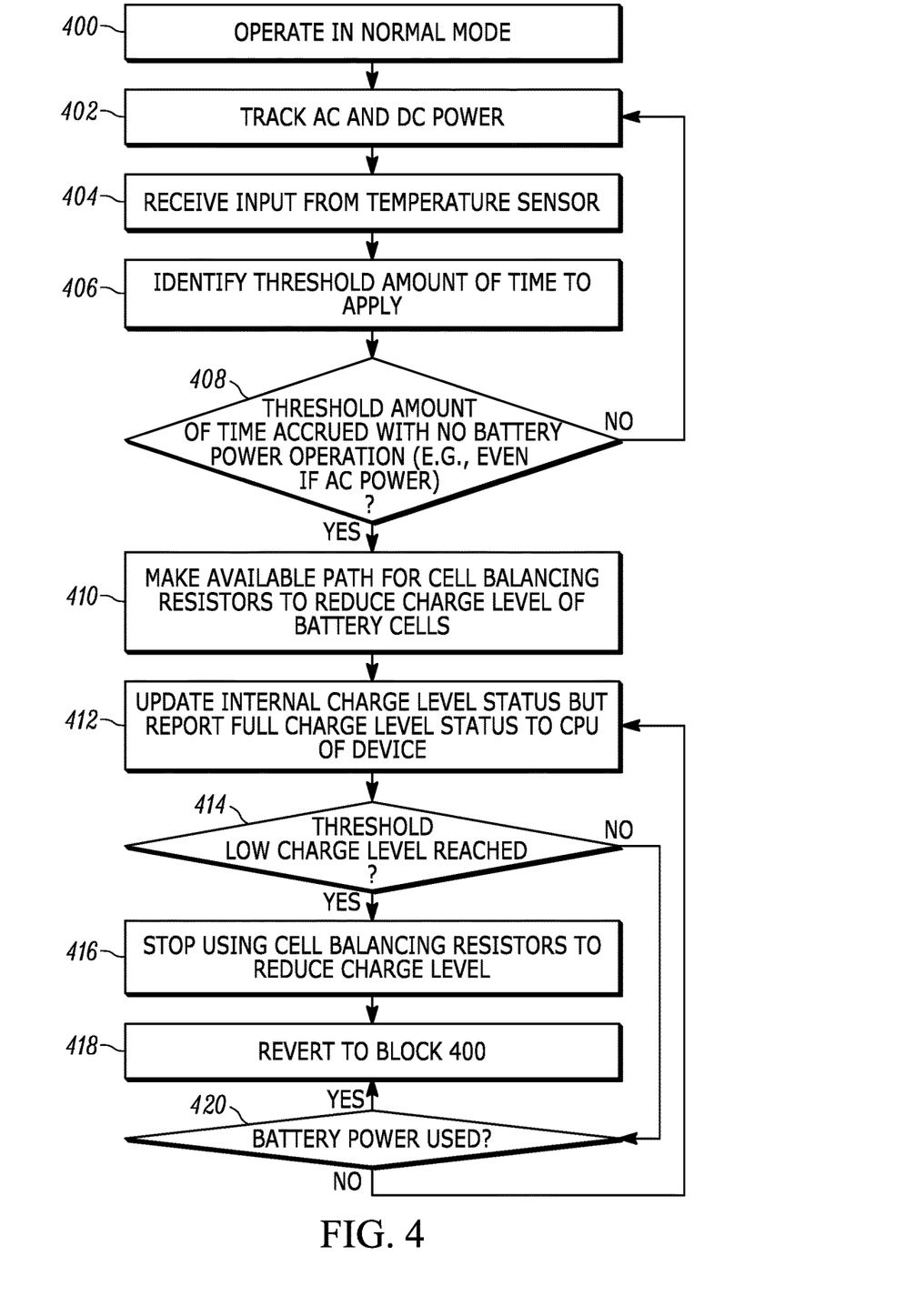
FIGS. 4 and 5 are flow charts of example algorithms in accordance with present principles.

Continuing the detailed description in reference to FIG. 4, it shows example logic that may be executed by a battery pack as part of firmware, e.g., stored in read-only memory (ROM) internal to the battery pack in accordance with present principles. The battery pack itself may me electrically and mechanically coupled to a device such as a personal computer, smart home appliance, or any other device that might operate on battery power.

Beginning at block 400, the battery pack may operate in a normal mode in which power may be provided to a consumer electronics device to which the battery pack is coupled. In such a normal mode, the battery pack may provide battery power from cells within the battery pack to the device. Additionally or alternatively, the battery pack may pass current from an AC/DC power supply to the device while the charge level for the battery cells is kept close to if not at fully charged, though current may also pass from the AC/DC power supply to the device without going through the battery.

From block 400 the logic may proceed to block 402 where the battery pack may track or monitor whether battery power from the battery cells is being provided to the device or if power from an external power source (e.g., wall outlet) is being provided to the device via the AC/DC power supply (though in other embodiments the CPU of the host device itself may determine if power from an external power source is being provided and report this to the battery pack for use by the battery pack in accordance with present principles). This may depend on whether the battery pack and/or device is connected to an external AC power source via the power supply, or whether the device is not connected to the external AC power source and only internal power from the battery pack is available, where the battery pack's BMU may monitor sensor input to determine whether battery cells are discharging and/or whether current is being received from the power supply. Additionally or alternatively, AC or DC power may be tracked by the host device itself.

Tracking or monitoring power at block 402 may also include tracking a length of time that power from the AC power source is consumed, tracking a length of time that battery power is consumed, and/or tracking a length of time no power is consumed such as if the device has been powered off. Time may be tracked using a timer or timer software executing inside the battery pack, or even in the host device itself but outside of the battery pack.

After block 402 the logic may move to block 404 where the battery pack may receive input from a temperature sensor within the battery pack that senses the temperature of the battery cells within the pack and/or the overall temperature of the battery pack itself. The logic may then move to block 406 where the battery pack may identify a threshold amount of time to use based on the input from the temperature sensor received at block 404. The threshold amount of time may be identified from a relational database stored in storage of the battery pack, with the database correlating temperature or temperature averages over a predetermined amount of time with various threshold amounts of time so that the higher the temperature/average, the lower the threshold amount of tune to be used.

From block 406 the logic of FIG. 4 may then move to decision diamond 408. At diamond 408 the battery pack may determine, based on the tracking performed at block 402, whether the threshold amount of time identified at block 406 has accrued, with the threshold amount of time being a non-zero amount of time during which no battery power from battery cells in the pack has been consumed by the device (or a limited amount such as not more than a 10% reduction to, e.g., a 90% charge level from a 100% charge level) even if power from an external power source has been consumed. For example, during the threshold amount of time the device might have been operated using only power from an AC/DC power supply in between power-off states, or the device might have been operated using only power from the AC/DC power supply for the entirety of the threshold amount of time without the device being powered off for any of the threshold amount of time.

Responsive to a negative determination at diamond 408, the logic may return to block 402 and proceed therefrom. However, responsive to an affirmative determination at diamond 408 the logic may instead proceed to block 410 where the battery pack processor may control/command one or more switches within the battery pack to make available one or more paths for cell balancing resistors within the battery pack to be electrically connected to the battery cells of the battery pack. In doing so, the voltage/charge level of the battery cells may be reduced via the cell balancing resistors. Thus, the cell balancing resistors may be employed automatically in such a manner based on execution of the logic of FIG. 4 by the battery pack without receiving user input related to battery maintenance, such as user input to reduce the voltage/charge level of the battery cells or to transition from the normal mode.

From block 410 the logic may then proceed to block 412. At block 412 the battery pack may, while the voltage/charge level of the battery cells is being reduced, report a full charge level status for the battery cells to the central processing unit (CPU) of the device or another processor of the device external to the battery pack despite the battery cells not actually being fully charged since their charge level is being progressively decreased via the resistors. This may be done so that the external processor of the device does not reach a determination that the battery's health or physical characteristics are degrading and undesirably adjust its own operation accordingly. But also at block 412, the battery pack may lower a charge level status of the battery pack that is maintained internal to the battery pack (e.g., its own "Full Charge Capacity" indicator) proportional to the actual reduction in voltage/charge level of the battery cells so that the charge level status maintained internal to the battery pack reflects the actual, current charge level of the cells at any given point in time during the resistors' use to reduce the charge level of the cells.

From block 412 the logic may then proceed to decision diamond 414. At diamond 414 the battery pack may determine whether a threshold low charge level and/or threshold low voltage level has been reached past which the charge level/voltage of the battery cells is not to be reduced using the resistors. Data indicating the threshold low charge level/voltage level may be stored in storage internal to the battery pack and accessible by the battery pack's processor for the determination made at diamond 414.

Responsive to an affirmative determination at diamond 414 the logic may proceed to block 416. At block 416 the battery pack may stop using the cell balancing resistors to reduce the charge level of the battery cells, such as by turning off the electrical switches that were turned on at block 410. From block 416 the logic may then proceed to block 418, at which the logic may revert back to block 400 and proceed therefrom in "normal mode". Alternatively, at block 418 the device may stay in its current "plugged-in mode" and only return to "normal mode" at block 400 if significant battery use occurs (such as, for example, battery use resulting in a charge level reduction to an even lower threshold level of 20% or below) or if another condition is satisfied such as the device using battery power for a threshold non-zero amount of time.

However, responsive to a negative determination at diamond 414 instead, the logic may proceed to decision diamond 420. At diamond 420 the battery pack may determine whether battery power has begun to be used or has been used for at least a threshold non-zero amount of time, as might be the case if the user has unplugged the AC/DC power supply from a wall outlet providing AC power while the device is still powered on. The determination at diamond 420 may be based on the battery pack monitoring whether power from the AC/DC power supply is being provided or whether battery power is being provided.

Responsive to a negative determination at diamond 420, the logic may move back to block 412 and proceed therefrom as described above. Responsive to an affirmative determination at diamond 420, the logic may instead move to block 418 and proceed therefrom as described above.

Figure 5:
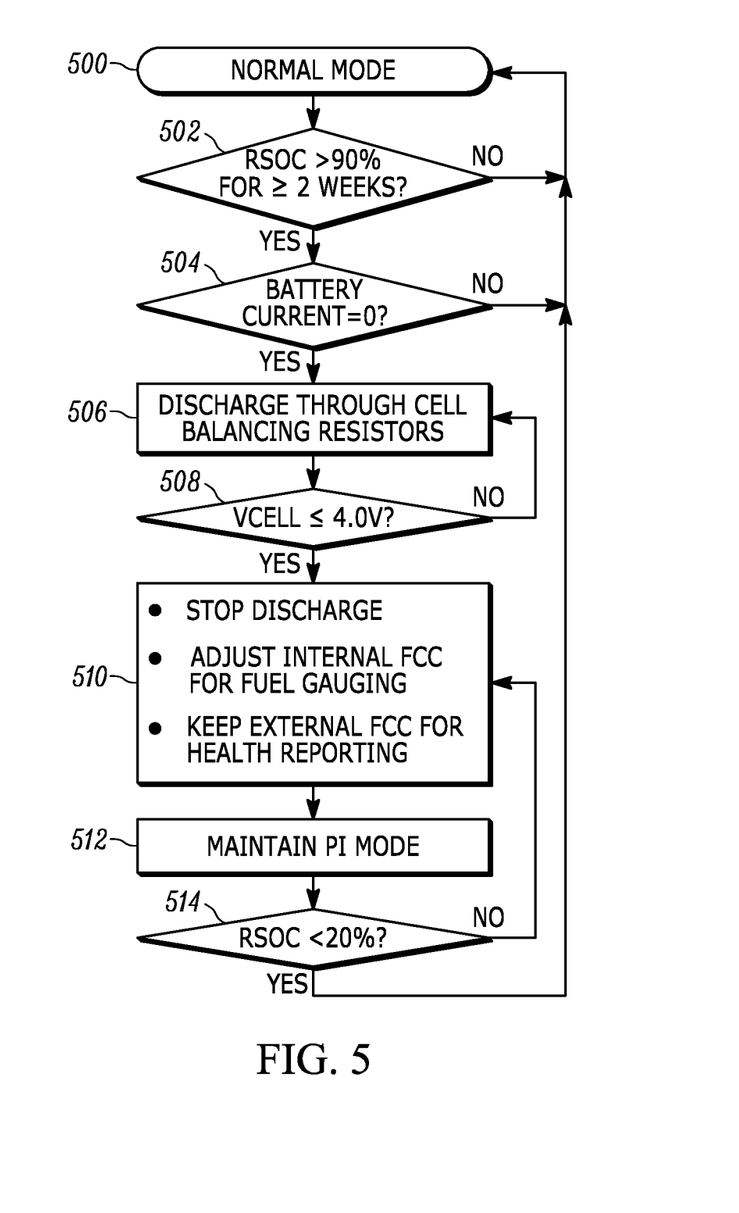

Reference is now made to FIG. 5, which also shows example logic that may be executed by a battery pack as part of firmware stored in the battery pack in accordance with present principles. FIG. 5 shows an example that includes various specific amounts for the threshold amount of time, threshold low charge level, etc. Thus, it is to be understood that various steps and implementation details of FIG. 4 may be executed in conjunction with the steps shown in FIG. 5 and vice versa.

Beginning at block 500, the battery pack may operate in a normal mode as described herein. The logic may then move to decision diamond 502 where the battery pack (or host device itself) may determine whether the relative state of charge (RSOC) for the battery cells of the battery pack has remained greater than a threshold charge level (e.g., ninety percent) for at least a threshold amount of time (e.g., two weeks or more) and/or whether a voltage level for the cells has remained greater than a threshold voltage level. Note that the threshold charge level/voltage level mentioned in the preceding sentence may be different from the threshold charge level/voltage level described above in reference to diamond 414. Thus, it is to be understood that there may be two threshold charge levels/voltage levels used in accordance with present principles, a higher threshold charge level/voltage level for the determination made at diamond 502 and a lower charge level/voltage level for the determination made at diamond 414.

Responsive to a negative determination at diamond 502, the logic may revert back to block 500 and proceed therefrom. However, responsive to an affirmative determination at diamond 502 the logic may instead proceed to decision diamond 504. At diamond 504 the battery pack may determine whether it is currently inactive (or inactive during the threshold amount of time of diamond 502). Being inactive may include the battery cells not having undergone any charge or discharge at present for the threshold amount of time, or not having undergone charge or discharge at present or for the threshold amount of time by more than a threshold nominal amount (such as less than one percent).

Responsive to a negative determination at diamond 504 the logic may revert back to block 500 and proceed therefrom. However, responsive to an affirmative determination at diamond 504 the logic may instead proceed to block 506. At block 506 the battery pack may discharge the battery cells using cell-balancing resistors as set forth herein.

From block 506 the logic may next proceed to decision diamond 508. At diamond 508 the battery pack may determine whether the voltage of the cells, either the voltage of each cell individually or the average voltage of all the cells, is less than or equal to a threshold low voltage amount (e.g., four volts). The determination at diamond 508 may be based on input from a voltage sensor(s) in the battery pack that is coupled to the cells to sense their voltages. Thus, it is to be understood that in some embodiments the steps described herein, including the determination at diamond 508, may be implemented by state logic as well as deterministic logic flows.

Responsive to a negative determination at diamond 508, the logic may revert back to block 506 and continue to discharge the battery cells via the cell balancing resistors until the threshold low voltage amount is reached. However, responsive to an affirmative determination at diamond 508 the logic may instead proceed to block 510.

At block 510 the battery pack may stop discharging the battery cells via the resistors. The battery pack may also adjust its internal full charge capacity (FCC), which may represent the actual charge amount that the battery cells currently hold so that the battery pack may keep updated on the actual charge level of the battery cells while still reporting an FCC of one hundred percent to the CPU of the device external to the battery pack so that the CPU does not make a determination that the battery cells' health or physical characteristics are degrading.

From block 510 the logic may then proceed to block 512 where the battery pack may maintain the "plugged-in" mode it has entered in which the cells of the battery back have been reduced to the threshold low voltage amount via the cell balancing resistors internal to the battery pack. From block 512 the logic of FIG. 5 may then proceed to decision diamond 514.

At diamond 514 the battery pack may determine whether the RSOC for the battery cells of the battery pack has dropped below a threshold low charge level of, e.g., twenty percent, and/or whether a threshold low voltage level has been reached by the cells. Additionally or alternatively but also at diamond 514, the battery pack may make other determinations that are indicative of the user using battery again. In any case, responsive to a negative determination at diamond 514, the logic may revert back to block 510 and proceed therefrom. However, responsive to an affirmative determination at diamond 514 the logic may instead revert back to block 500 where the "normal mode" is again entered and the battery cells may be charged back to full capacity while the battery pack processor also instantly) adjusts its internal FCC.

Figure 6:
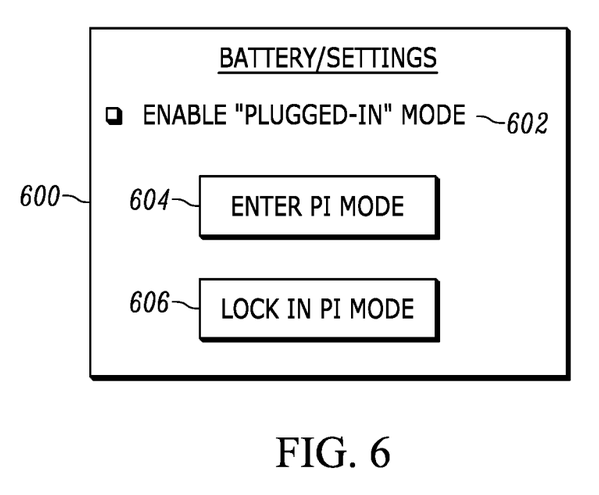
FIG. 6 is an example user interface (UI) in accordance with present principles.

Moving on to FIG. 6, it shows an example graphical user interface (GUI) 600 that is presentable on a touch-enabled display of a device coupled to a battery pack programmed to undertake present principles. It is to be understood that, despite the steps shown in FIGS. 4 and 5 being executed by a battery pack's processor internal to the battery pack without receiving any user input to initiate those processes, in some embodiments the device itself may nonetheless allow a user to provide input related to those processes. For example, option 602 may be selected by directing touch or cursor input to the check box shown adjacent to it to enable the battery pack to undertake the logic of FIG. 4 and/or FIG. 5 and maintain the battery's cells in normal mode until a threshold amount of time has been reached as described herein.

A selector 604 may also be selected by a user using touch or cursor input to issue a command for the battery pack to transition to its "plugged-in" mode at the time of selection of the selector 604 and hence begin reducing the charge level of the battery pack's cells using cell balancing resistors. A selector 606 may also be selected to issue a command for the battery pack to maintain or "lock in" the plugged-in mode such that the battery pack's RSOC may reach its threshold low charge level and either maintain charge at that level or continue to allow the cells to discharge using the cell balancing resistors.

As yet another example, a button on the device such as the button 199 described above may be selected to command the battery pack to enter the "plugged-in" mode or to "lock in" the plugged-in mode.

Figure 7:
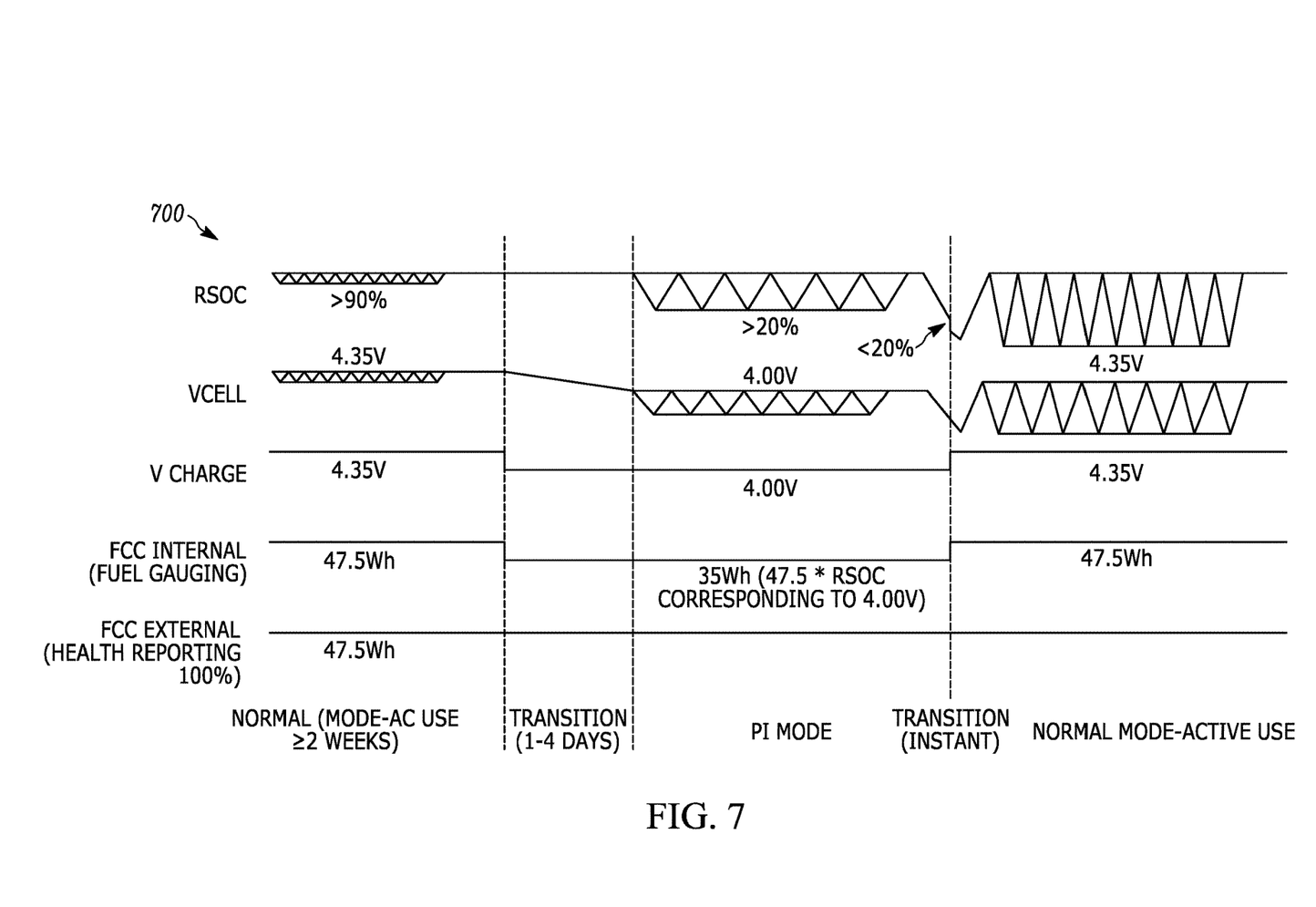
FIG. 7 is an example chart illustrating present principles.

FIG. 7 is a chart 700 that illustrates present principles using example metrics. There are four columns on the chart illustrating, left to tight, normal mode, the transition from normal mode to plugged-in mode in which cell balancing cell resistors are used to reduce the charge level of battery cells, the plugged in mode itself, and return to normal mode. "RSOC" is indicated on the chart and is understood to be the RSOC of the battery cells that is reported external to the battery pack as the various modes are transitioned between. "Veen" illustrates the actual change in voltage that the battery cells undergo as the various modes are transitioned between. "V charge" illustrates the battery pack's own internal targets for voltage as the various modes are transitioned between. "FCC Internal" illustrates the battery pack's internal FCC that it adjusts for internal tracking as the cells undergo voltage changes. "FCC External" illustrates the battery pack's external FCC as reported to a device's CPU external to the battery.

Moving on from FIG. 7, it is to be understood in accordance with present principles that should a device such as a computer or smart home appliance have two batteries/battery packs rather than one, present principles may be employed with an overall RSOC/voltage for both batteries being used for plugged-in mode entry and exit, or present principles may be employed on a per-battery basis independently of the RSOC/voltage of the other battery. Additionally, in embodiments with two or more batteries/battery packs, the cells of both battery packs may both be brought down to the same threshold low voltage amount and/or threshold low charge level for the threshold low voltage amount and/or threshold low charge level to be met.

It is to be further understood that in some embodiments, for the plugged-in mode to be entered into, a device coupled to a battery pack undertaking present principles may not be turned off for any part of the threshold amount of time. This may be done so that, should the device be powered off and stored for the duration of (or any part of) the threshold amount of time, the charge level of the battery may be kept relatively higher than had plugged-in mode been entered into so that the battery may have an adequate (e.g., full) charge level when the user decides to power the device back on and use it using battery power. However, still note that in other embodiments the device may be turned off for at least part of the threshold amount of time for the plugged-in mode to be entered into.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   system components;
   at least one processor; and
   a battery pack, the battery pack comprising:
      one or more cell balancing resistors;
      plural battery cells in a circuit with the one or more cell balancing resistors; and
      storage accessible to the at least one processor and comprising instructions executable by the at least one processor to:
         determine whether a threshold amount of time has accrued during which the device has not been operated on battery power; and
         responsive to a determination that the threshold amount of time has accrued, employ the one or more cell balancing resistors of the battery pack to reduce the charge level of the plural battery cells.

2. The device of claim 1, wherein the at least one processor is disposed within the battery pack, and wherein the instructions are embodied in firmware of the battery pack.

3. The device of claim 1, wherein the device has been operated using an alternating current (AC)/direct current (DC) power supply during the threshold amount of time.

4. The device of claim 1, wherein the device has been operated using an alternating current (AC)/direct current (DC) power supply for the entirety of the threshold amount of time and has not been powered off for any of the threshold amount of time.

5. The device of claim 1, wherein the one or more cell balancing resistors are employed without receiving user input related to battery maintenance.

6. The device of claim 1, wherein the instructions are executable by the at least one processor to:
   subsequent to employing the one or more cell balancing resistors and responsive to the battery cells reaching a threshold charge level, cease to employ the one or more cell balancing resistors of the battery pack to reduce the charge level of the plural battery cells.

7. The device of claim 1, wherein the instructions are executable by the at least one processor to:
   subsequent to employing the one or more cell balancing resistors and responsive to the device being operated on battery power, cease to employ the one or more cell balancing resistors of the battery pack to reduce the charge level of the plural battery cells.

8. The device of claim 1, wherein the instructions are executable by the at least one processor to:
   determine whether the threshold amount of time has accrued during which the device has not been operated on battery power and during which the charge level of the plural battery cells remains above a threshold charge level; and
   responsive to a determination that the threshold amount of time has accrued during which the device has not been operated on battery power and during which the charge level of the plural battery cells remains above the threshold charge level, employ the one or more cell balancing resistors of the battery pack to reduce the charge level of the plural battery cells.

9. The device of claim 1, comprising a temperature sensor in the battery back, and wherein the threshold amount of time varies based on input from the temperature sensor.

10. The device of claim 1, wherein the instructions are executable by the at least one processor to:
    during reduction of the charge level of the plural battery cells using the one or more cell balancing resistors, report a full charge level status to at least one of the system components.

11. A method, comprising:
    using a processor to determine whether a threshold amount of time has accrued during which a device coupled to a battery pack has not been operated on battery power; and
    using, responsive to determining that the threshold amount of time has accrued, the processor to control one or more cell balancing resistors of the battery pack to reduce the charge level of battery cells within the battery pack.

12. The method of claim 11, wherein during the threshold amount of time the battery cells do not discharge by more than a nominal amount.

13. The method of claim 11, comprising:
    stopping, subsequent to using the one or more cell balancing resistors and responsive to the charge level of the battery cells lowering to a threshold charge level, use of the one or more cell balancing resistors to reduce the charge level of the battery cells.

14. The method of claim 11, wherein the threshold amount of time varies based on a temperature associated with the battery pack so that the higher the temperature the lower the threshold amount of time.

15. The method of claim 11, comprising:
    reporting, during reduction of the charge level of the battery cells using the one or more cell balancing resistors, a full charge level status to at least one system component of the device external to the battery pack.

16. The method of claim 15, comprising:
    lowering, during reduction of the charge level of the battery cells using the one or more cell balancing resistors, a charge level status of the battery pack that is maintained internal to the battery pack.

17. A computer readable storage medium (CRSM) that is not a transitory signal, the computer readable storage medium comprising instructions executable by at least one processor to:
    determine whether a threshold amount of time has accrued during which a device coupled to a battery pack has not been operated on battery power but has been operated using an alternating current (AC)/direct current (DC) power supply; and
    responsive to a determination that the threshold amount of time has accrued, control one or more resistors inside the battery pack to reduce the charge level of battery cells within the battery pack.

18. The CRSM of claim 17, wherein the instructions are embodied in firmware that is transferable to the battery pack for execution by the at least one processor internal to the battery pack.

19. The CRSM of claim 17, wherein the determination of whether the threshold amount of time has accrued during which the device has not been operated on battery power but has been operated using an AC/DC power supply comprises:
    determining whether the threshold amount of time has accrued during which the has not been operated on more than a nominal amount of battery power.

20. The CRSM of claim 17, wherein the instructions are executable by the at least one processor to:
    during reduction of the charge level of the plural battery cells using the one or more resistors, indicate a full charge level status to at least one computing component external to the battery pack despite the actual charge level of the battery cells decreasing.

\* \* \* \* \*